United States Patent [19]

Legaignoux et al.

[11] Patent Number: 4,708,078
[45] Date of Patent: Nov. 24, 1987

[54] PROPULSIVE WING WITH INFLATABLE ARMATURE

[76] Inventors: Dominique M. Legaignoux; Bruno T. Legaignoux, both of 26, ch. deKernoter, 29000 Quimper, France

[21] Appl. No.: 905,335
[22] PCT Filed: Nov. 8, 1985
[86] PCT No.: PCT/FR85/00318
  § 371 Date: Aug. 13, 1986
  § 102(e) Date: Aug. 13, 1986
[87] PCT Pub. No.: WO86/02902
  PCT Pub. Date: May 22, 1986

[30] Foreign Application Priority Data

Nov. 16, 1984 [FR] France .................. 84 17701

[51] Int. Cl.4 .......................... B64C 3/46; B63H 9/06
[52] U.S. Cl. ................................. 114/102; 114/39.2; 244/145; 244/900
[58] Field of Search .............. 244/145, 900, 901, 902, 244/903, 218; 114/102, 103, 39.1

[56] References Cited

U.S. PATENT DOCUMENTS 3,412,963 11/1968 Struble, Jr. ............... 244/DIG. 1.3
3,480,238 11/1969 Barish ..................... 244/DIG. 1.3
4,612,868 9/1986 Reynolds ..................... 114/103

FOREIGN PATENT DOCUMENTS 2727411 1/1979 Fed. Rep. of Germany ...... 244/900
2750278 5/1979 Fed. Rep. of Germany ...... 244/902
0131459 6/1978 German Democratic Rep. ................... 114/102
7603691 10/1977 Netherlands ................. 114/39.2
1585099 2/1981 United Kingdom ...... 244/DIG. 1.3

Primary Examiner—Joseph F. Peters, Jr.
Assistant Examiner—Edwin L. Swinehart

[57] ABSTRACT

A very light wing, configured like a spherical segment, is intended to be used in the traction and lift of various loads. The wing includes a leading edge and a trailing edge and an inflatable armature covered by a flexible envelope. The surfaces of the wing are configured in the shape of an aircraft wing profile and the edges of the wing curve in two planes. The leading and trailing edges of the wing are oriented to intersect near the tips of the wing, and each of the tips of the wing receives a control rope via an adjusting plate. The control rope is passed through a pulley mounted on a craft to be displaced by a person through a harness. The wing can be used in sliding sports, yachting and gliding.

4 Claims, 10 Drawing Figures

PROPULSIVE WING WITH INFLATABLE ARMATURE

This invention concerns a propulsive wing of thick profile linked by control ropes to the load to be pulled and including a inflatable armature as well as a thin and flexible envelope.

There is a new generation of sails (still at the experimental stage) usable in the form of kites, that is to say linked to the load exclusively by the control ropes, with these generally being limited in number. These sails have numerous theoretical advantages: they relieve the strain on the sail-boat instead of forcing down its edge under the wind (supporting effect), they have an excellent efficiency ratio because they are not subjected to the disturbing influence of the wind, they are able to take advantage of the stronger and more regular winds found at a higher altitude, and above all they have an irreversible profile in that they can pivot so that they always present the same edge. And yet, in practice, it is clear that such sails are confronted with new problems which limit their efficacity: superimposed kite systems, in a chain formation, pose great difficulties of deployment during launching, which has to take place, of necessity, on land. Some, because they are deployed on a rigid armature, are relatively heavy and difficult to manage. Others, whether or not they are inflatable, can only be maintained in position by a complex system of wires, whose use is delicate and constraining. Moreover, these sails for the most part have a mediocre aerodynamic profile because they are subject to secondary requirements which are often highly complex.

The propulsive wing described in this invention, because of its refined shape, provides a solution to these difficulties. In fact, this wing, which is configured like a spherical gore, enables, thanks to the minimum strain it imposes on the structure, the use of an inflatable armature. This armature contains compressed air and is designed and calculated to integrate itself perfectly with the shape of the wing, without interfering with air-flow. It has a leading strut of a clearly semi-circular shape and several struts which are transverse to the former. It is enveloped in a resistant, light-weight material arragned in such a way as to give it an aircraft wing profile of maximum efficiency. This wing is therefore of great lightness and very reduced dimension, once deflated and folded. Each end of the wing takes a long control rope fixed to the load to be pulled, thus enabling the wing to controlled and directed. In order to adapt the wing to the different wind strengths, it is possible to reduce the sail surface by removing the rear part of the material by some appropriate method, such as a zip fastener.

Finally, both by the considerable buoyancy provided by the armature and by the simplicity of the control system, take-off even on water being extremely easy to effect, this wing can be controlled by a user mounted on one or two skates or shoes, using a pulley attached to this harness and through which is passed a single control rope linked to the two ends of the gore.

The propulsive wing is described in detail in the annexed drawings, provided as examples and on which:

The wing is always shown inflated by the wind. Its size can vary enormously according to the use, from less than half a sqaure meter in a child's toy to several dozens or even hundreds of square meters for heavy loads. The shape of the profile can also vary.

Figure 1:
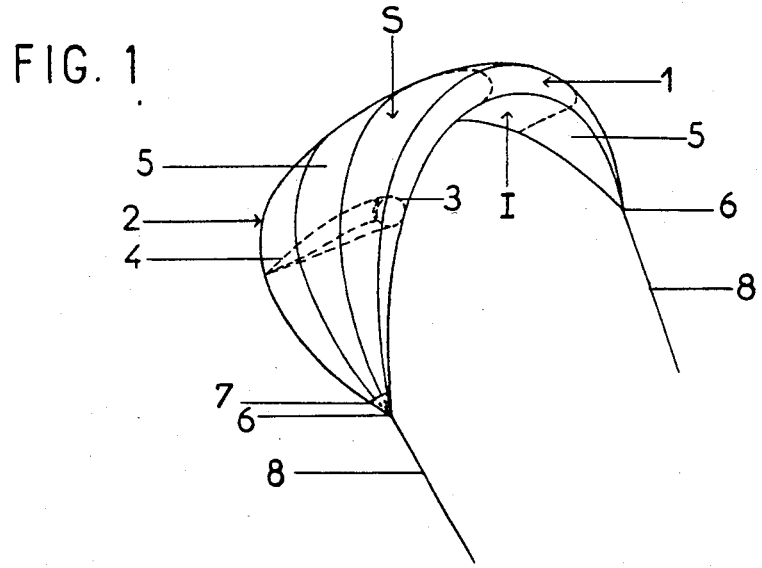
FIG. 1 shows, in perspective, the wing according to the invention.

FIG. 1 gives an overall view of the wing. This is in the form of a spherical gore comprizing a leading edge (1) and a trailing edge (2) and is embodied by an inflatable armature (3 and 4) covered by a flexible envelope (5) both in the intrados (I) and in the extrados (S). Each of its tips (6) receives through an adjusting plate (7) a control rope (8) linked to the load.

Figure 2:
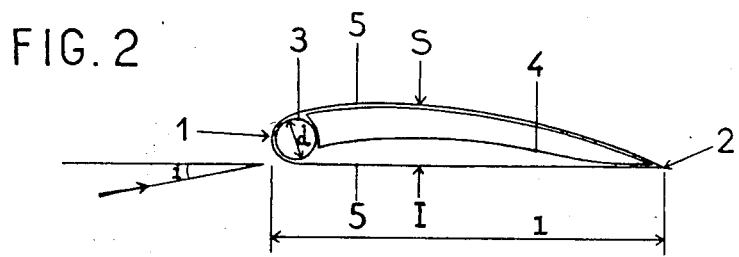
FIG. 2 shows, in section, the wing profile.
Figure 3:
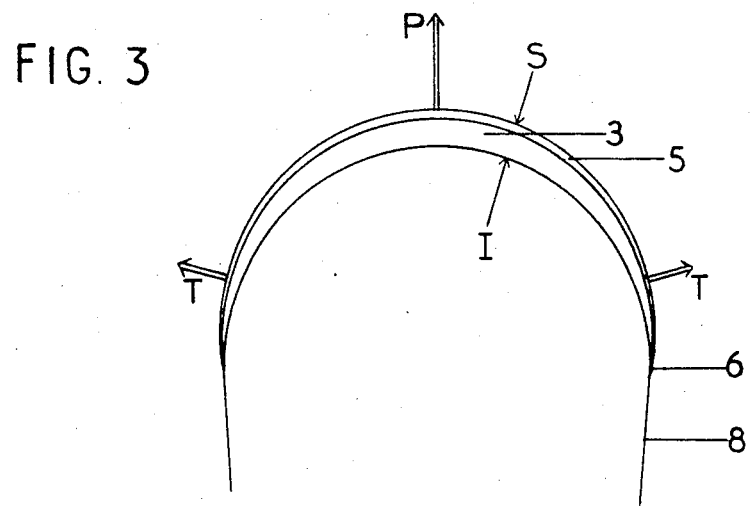
FIG. 3 shows, edge on, the wing according to the invention.

This wing functions aerodynamically speaking as an aircraft wing as FIG. 2 shows, that is, it attacks the wind with a small angle of incidence (i) creating a pressure on the intrados side and a depression on the extrados side (S), the wind moving from the leading edge (1) towards the trailing edge (2). The essential difference to an aircraft wing is that the former is a flat surface seen edge on and the wing in accordance with the invention is clearly semi-circular, as shown in FIG. 3. The main advantage of this shape lies in the fact that it imposes a minimum of strain on the armature. Moreover, the shape is self-sufficient, that is, it needs no auxiliary structure. in fact the surface can be broken down diagrammatically into three parts: a central part which develops the propulsive force (P) (the wing properly speaking), and two end-pieces. These latter represent about a third of the total surface and have three functions:

They act as control surfaces, that is they give longtitudinal stability to the wing.

They generate a force (T) which holds the tips apart and thus holds the structure deployed.

They act as end-plates for the propulsive part (P) of the wing, that is, they limit the loss of pressure on the intrados to a minimum and therefore the filling out of the depression on the extrados (S) (a problem with standard sails). For this reason they can be called dynamic control surfaces.

Figure 4:
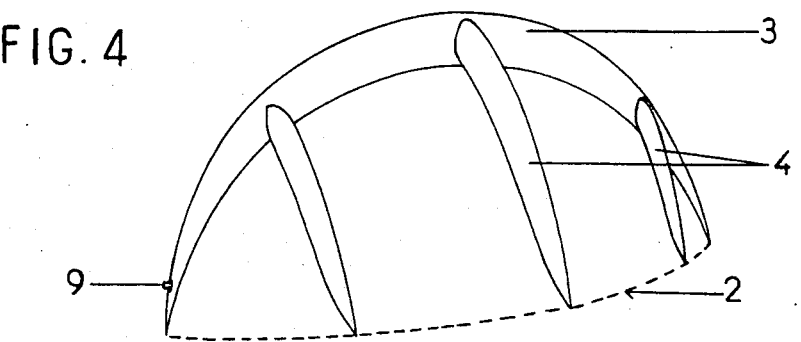
FIG. 4 shows, in perspective, the inflatable armature.

But no sail can present a small angle of incidence to the wind if it is not maintained on the desired shape by an appropriate armature. The armature of the propulsive wing shown in FIG. 4 is inflatable, using an inflatable boat pump, for example, through one or several orifices (9), provided with stoppers and (secondarily) non-return valves. The pressure required is relatively weak and air can be replaced by a lighter gas to facilitate flight in weak wind conditions. The struts are of round section and their shape is calculated for maximum integration into the profile. They can be made in two ways: either as a duct plus an air chamber, or as an inextendable air chamber alone. The material must be flexible and stand up in suitable fashion to the pressure and to repeated foldings. Finally, the struts can be linked together, requiring only one inflating orifice, or separated, in which case several orifices are required.

The leading strut (3) is equal in length to the leading edge. Its diameter (d) (FIG. 2) is proportional to the length of the profile (1) and this at all points on the sail. This strut therefore becomes thinner towards its end to finish in a tip, which gives it, seen edge on, the shape of a crescent (FIG. 3). Its role is to prevent the leading edge (1) from moving away and the whole wing from becoming deformed, something which would greatly disturb flight control.

The transverse struts (4) have a length equal to the length of the profile at the position where they are placed less the thickness of the leading strut against which they abut. Their number varies in relation to the size of the wing, and the thickness and flexibility of the fabric. Taking the example of a surface of 4 m2 and fabric of 100 gr/m2, there would be three struts regularly spaced. Their role is to prevent the fabric from creasing and they therefore work above all in compression.

As shown in FIG. 2, this armature bears an envelope (5) made of a flexible, light fabric made from a synthetic material or plastic sheeting, which does not lose its shape easily or absorb water and is as resistant as possible to wear and tear. This envelope totally surrounds the armature, hiding it completely. The envelope and the armature are fixed together at their points of contact. A layer of fabric covers the upper side of the armature and forms the extrados (S) while another layer covers the underside, forming the intrados (I). They meet at the back and are fixed togther.

Figure 5:
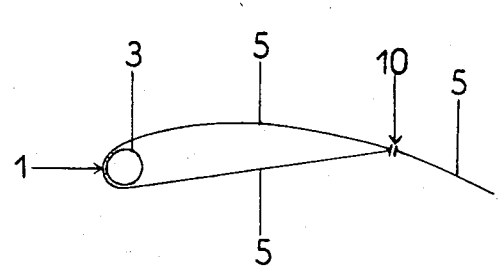
FIG. 5 shows, in section, a variation of the profile with a system for reducing the sail.
Figure 6:
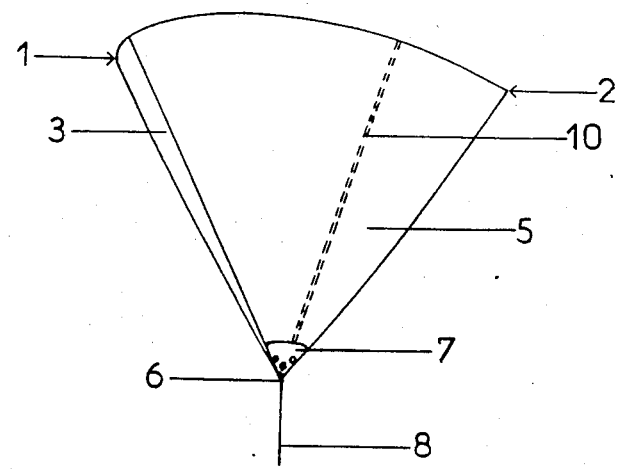
FIG. 6 shows, in profile, the wing according to the invention.

In a different version (shown in FIGS. 5 and 6) one can use the same wing to provide two sail surface sizes, depending on the strength of the wind. To achieve this, it is necessary to fix a zip fastening (10) lengthwise across the sail, generally across the rear third of the surface, in order to obtain a narrower wing if needed. As an example, a wing of 6 m2 can be reduced to 4 m2. This can be a very practical solution on condition that the intrados envelope is fixed at the level of the zip fastening, or removed (although the latter can slightly reduce wing performance). Again it is necessary to ensure at the profile design stage that the reduction in sail surface will not affect the equilibrium of the sail. Finally, to obtain the best flight performance, the wing must have a wing length/maximum profile length ratio higher than 2, the length of the wing being the length of the envelope (2) between the two tips.

As the wing is held at the two tips, it is in a position of stable equilibrium in flight when its angle of incidence in relation to the wind (i) provides a laminar air-flow round the profile. The angle (i) must be very small to enable the right direction or angle of lift in relation to the wind. To achieve this result, the tips (O) (FIG. 7) must be an extension of the force (R) resulting from the push and drag forces, (R) being located at 42% of the length of the profile. This percentage can vary by a small amount depending on the shape of the profile. As the wing surface is curved in both directions, and therefore not expandable, and this percentage having also to be respected, it becomes impossible to manufacture a wing of perfect shape according to old-fashioned methods. It is for this reason that a method using graphic projection (see FIGS. 7, 8 and 9) has been developed, making it possible to ascertain the exact shape of the sail-pieces or pieces of fabric which, assembled according to a radial disposition, form the envelope. Using this method the shape of the profile can be respected at all points on the wing.

Figure 7:
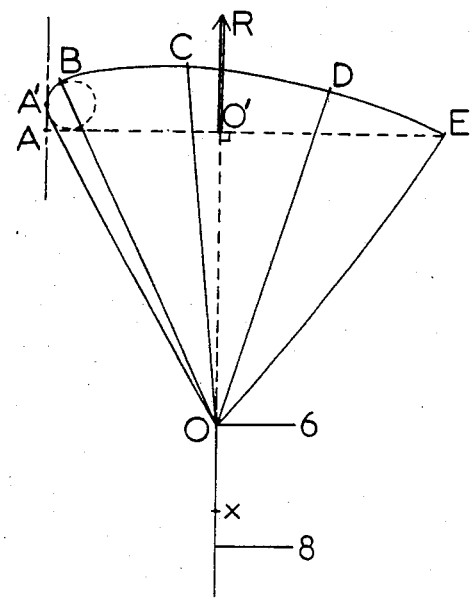
FIG. 7, 8 and 9 show the three stages of the graphic method of tracing the sail pieces.

On FIG. 7, the thick line represents the wing seen from the side. The number of pieces and the shape of the profile have been chosen arbritarily. Let (O) be one of the tips of the sail, (AA') the axis delimiting the front of the profile and parallel to (OO'), (AE) the length of the profile. The surface (OA'B) represents the leading strut, (OBC), (OCD) and (ODE) being the sail pieces. The point (O'), the orthogonal projection of (O) on the straight line (AE) is such that AO'=42% of (AE). The projection is carried out from the imaginary point (X) located on the straight line (O'O) such that O'X >/ OO'.

Figure 8:
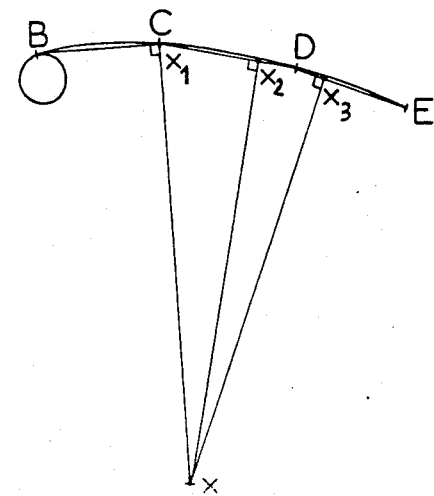

FIG. 8, traced from FIG. 7, is a section of the chosen profile (only the extrados in this demonstration). Three straight lines (BC), (CD) and (DE) are traced, representing the profile obtained after assembly of the sail pieces (the more numerous the pieces, the closer the profile obtained is to the one intended). A perpendicular is projected from the point (X) to each of the straight lines. One obtains the intersection points (X1), (X2) and (X3).

Figure 9:
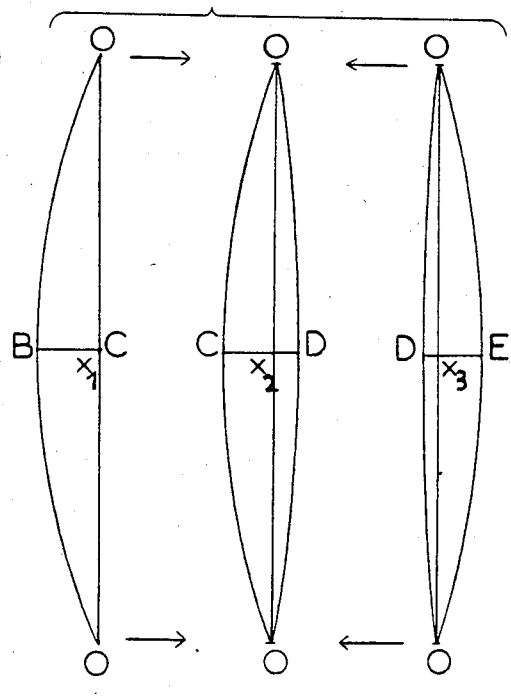

FIG. 9, taken from FIG. 8, but shown here at ½ scale, gives the exact shape of the sail-pieces. The three straight lines (BC), (CD) and (DE) are reproduced horizontally with the points (x1), (x2) and (x3). Verticals are traced to these points which stop at the tips (O) of the wing. For each piece one traces two arcs from the tips (O) and passing through points (B), (C), (D) and (E). In this example, (C) being integral with (x1), one obtains a straight line behind the first piece. The pieces are assembled in accordance with the arrows, edge against edge, in such a way that the tips (O) join at the same point, by glueing, sewing or any other appropriate means. They are then fixed to the armature. This method of manufacture using assembled pieces requires few facilities for artisanal production. However other methods of manufacture are envisagable in an industrial context, for example heat-forming of flexible sheeting on a wing-shaped mould, using various materials.

Moreover, in order to enable a precise adjustment of the angle of incidence (i), each tip can be provided with an adjusting plate (7) pierced with several holes, to which is fixed the control rope. If this is attached towards the rear of the plate, the angle (i) becomes large, and if it is attached towards the front, (i) becomes small. The angle (i) hardly varies with the wind, except where the wind is weak, when the weight of the wing influences its behavior.

The control rope (8) must be light, resistant and stretch the least possible. Its length does not depend on any particular requirements. However, it should be borne in mind that while the wind is stronger and more regular at a certain altitude, the weight of the control rope and its wind take-up may interfere with control of the wing. This is why a length of several dozen meters for wings of less than 10 to 20 m2 seems suitable for kite use.

When the load to be pulled is a machine or device, the wing is linked to it by a single control rope passing through one or several pulleys.

Figure 10:
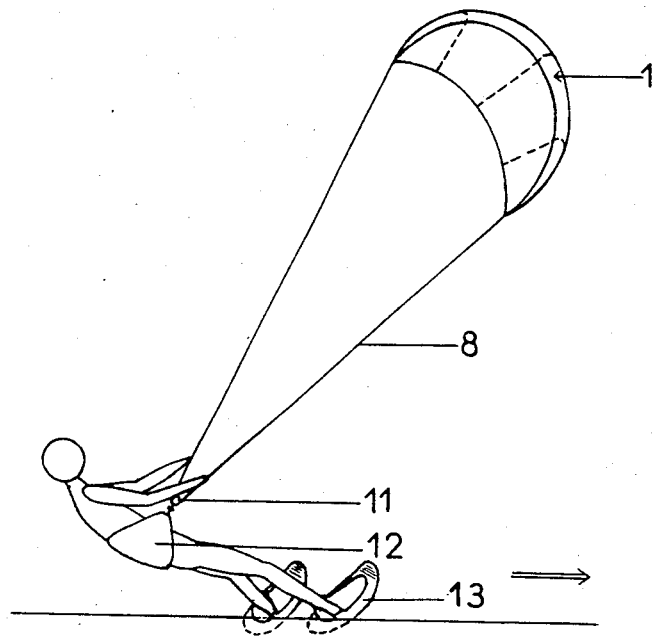
FIG. 10 shows the most sporting use in a nautical context.

When the load to be pulled is the user mounted on a small-sized machine, the control rope (8) is used as shown in FIG. 10 to adjust the wing in the desired direction. Each of its ends is connected to one of the tips (6) of the wing. It passes through a swivel block (11) which turns freely on itself, fixed to a harness (12) worn by the user. The propulsive force provided by the wing acts on the control rope (8) of the pulley (11) then on the user, but the latter can control the apparatus by only slight effort, because the tensions on the control rope are always equal on both sides of the pulley. The swivel block enables the pulley (11) to turn on itself in order to eliminate twists in the control rope (caused notably by take-off manoeuvers).

Using this insubmersible wing and its control system, take-off over water is extremely easy and requires no external assistance. In its most sporting application in a nautical context, the user is equipped with one or two special skates or shoes (13).

In a flight application, a person suspended from the wing by means of an appropriate harness, uses the same control system as described above (FIG. 10).

This wing can be used for traction or support of a person, a load, a device or machine on water, on the ground (snow, ice, grass, sand, etc) or in the air. Among its numerous possible applications the most obvious concern sliding sports, yachting, and sail-flight.

We claim:

1. In a propulsive wing of an aerodynamic profile linked by control ropes to a load, the wing including a thin flexible envelope and having a top surface and a bottom surface and an inflatable armature made up of a first strut and second struts, the first strut extending along a leading edge of the wing and having a thickness dimension that varies according to location along the wing leading edge whereby the first sturt has a thickness at its extremities that is less than the thickness of the first sturt near the middle section thereof, the wing having a tailing edge, the first strut extremities forming tips, the improvement in combination therewith comprising: the leading and trailing edges of the wing being oriented to intersect each other near the first strut tips and the wing having an arcuate shape between the tips to form a lune-like spehrical segment which curves in two planes from one of the tips through the middle section of the first sturt to the other of the tips with each tip being adapted to receive a control rope with only two control ropes being required by the wing, the improvement further comprising the variation of the first strut thickness dimension defining a crescent shape for the wing dimension between the top and the bottom surfaces of that wing.

2. The propulsive wing as defined in claim 1, wherein the improvement further comprises forming the exact shape of various pieces of the wing using a graphic method of orthogonal projection from a given point towards a required profile segment, and arranging the pieces thus formed according to a radial position to form the envelope.

3. The propulsive wing according to claim 1, wherein the improvement further comprises a zip fastener for coupling a rear part of the envelope to a removable part.

4. The propulsive wing according to claim 1, wherein the improvement further comprises connecting each end of the control rope to one of said tips, and further including a swivel block on the control rope and a harness adapted to be fixed to a user and adapted to be connected to said swivel block.

* * * * *